(12) United States Patent
Ray et al.

(10) Patent No.: US 11,087,429 B2
(45) Date of Patent: Aug. 10, 2021

(54) RUN-TIME OPTIMIZATION OF MEDIA PIPELINES

(71) Applicant: Red Hat, Inc., Raleigh, NC (US)

(72) Inventors: Debarshi Ray, Brno (CZ); Arjun Shankar, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/517,155

(22) Filed: Jul. 19, 2019

(65) Prior Publication Data

US 2021/0019857 A1 Jan. 21, 2021

(51) Int. Cl.
*G06T 1/20* (2006.01)
*G06F 8/41* (2018.01)

(52) U.S. Cl.
CPC .............. *G06T 1/20* (2013.01); *G06F 8/4441* (2013.01)

(58) Field of Classification Search
CPC ...... G06F 8/443; G06F 9/3826; G06F 8/4452; G06F 8/447; G06F 8/47; G06F 9/45516; G06F 9/4552; H04N 19/103
See application file for complete search history.

(56) References Cited

U.S. PATENT DOCUMENTS

| | | | |
|---|---|---|---|
| 8,087,010 B2 | 12/2011 | Eichenberger et al. | |
| 2009/0064117 A1* | 3/2009 | Bashkansky | G06F 8/443 717/154 |
| 2009/0280844 A1* | 11/2009 | Norton | H04L 65/605 455/466 |
| 2014/0281424 A1* | 9/2014 | Bobba | G06F 9/3005 712/225 |
| 2015/0058601 A1* | 2/2015 | Arunagiri | G06F 9/3826 712/216 |
| 2019/0065248 A1* | 2/2019 | Ravindran | G06F 9/4881 |

OTHER PUBLICATIONS

Kaushik et al., "Loop Fusion in LLVM Compiler", Sri Jayachamarajendra College of Engineering (SJCE), Mysore-570 006, Feb. 2015, 39 pages.
Hickson, "Media Capture and Streams", W3C Candidate, https://www.w3.org/TR/mediacapture-streams/, Oct. 3, 2017, 109 pages.
Allen et al. "Groovy Language Documentation", Version 2.5.7, docs.groovy-lang.org/latest/html/documentation/, Feb. 1, 2019, 505 pages.

* cited by examiner

*Primary Examiner* — Hau H Nguyen
(74) *Attorney, Agent, or Firm* — Womble Bond Dickinson (US) LLP

(57) ABSTRACT

A method comprises receiving, by a media pipeline framework, a plurality of copies of each block of a media pipeline, wherein a first copy of the plurality of copies is a high-level representation of the respective block and wherein the second copy of the plurality of copies is a machine-readable copy. The method further comprises generating, by a processing device, a run-time-optimized media pipeline using the first copy and the second copy.

20 Claims, 8 Drawing Sheets

RUN-TIME OPTIMIZATION OF MEDIA PIPELINES

TECHNICAL FIELD

Aspects of the present disclosure relate to optimizations for media pipelines.

BACKGROUND

Media (e.g., image, video, sound, etc.) processing, or graphics programming, can be performance sensitive. The processing code loops over each pixel in an image, and it is common to have multiple such loops (e.g., when a variety of modification layers are to be executed on an image). Given that even basic smartphone cameras have resolutions measured n megapixels, there are usually millions of pixels involved in such processing.

If the processing code in question is being interactively used by a user (e.g., a user is applying image adjustments, filters, for example, then the performance requirements of such code may be even more strict. One common expectation is that an image, or a single frame in a video, be fully processed in less than 16.67 milliseconds so that 60 such images or frames can be handled in a single second. This is rooted in the fact that many display systems have a refresh rate of 60 Hz.

BRIEF DESCRIPTION OF THE DRAWINGS

The described embodiments and the advantages thereof may best be understood by reference to the following description taken in con unction with the accompanying drawings. These drawings in no way limit any changes in form and detail that may be made to the described embodiments by one skilled in the art without departing from the spirit and scope of the described embodiments.

DETAILED DESCRIPTION

Figure 1:
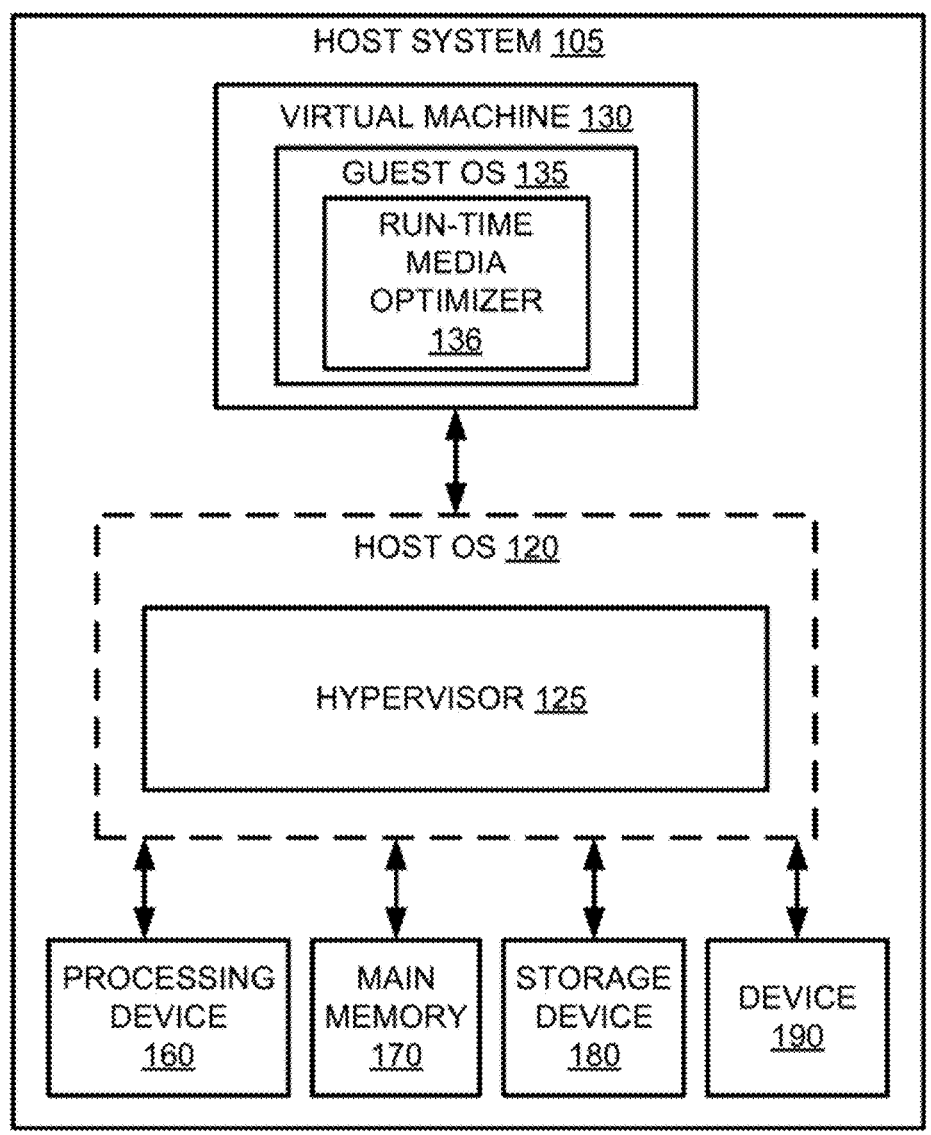
FIG. 1 depicts a first high-level component diagram of an example computer system architecture, in accordance with one or more aspects of the present disclosure.

Described herein are methods and systems for run-time optimization of media pipelines. As used herein, media describes any form and/or mixed form of media, including images, videos, sounds, etc. A video includes any number of video frames, and the terms image and video frame are used interchangeably herein for convenience and brevity.

As described herein media processing can be performance sensitive. Media processing may include executing medications to images, such as applying adjustments (e.g., pertaining to contrast, brightness, saturation, blur, etc.), and groups of adjustments (e.g., filters). In some embodiments, such media processing is performed on the fly (e.g., in real time). One such example of on-the-fly processing is the modification of a live video. For example, a user may modify various characteristics of a live video, while simultaneously viewing and recording the live video with modifications. In another example, the processing is not done on the fly, but is similarly constrained with respect to performance requirements.

One common expectation is that an image, or a single frame in a video, be fully processed in less than 16.67 milliseconds so that 60 such images or frames can be handled in a single second. This is rooted in the fact that many display systems have a refresh rate of 60 Hz. In other embodiments, 120 Hz is desired. Given the number of times each pixel must be looped over to perform a modification, and the number of pixels in a single image, meeting such demanding requirements can be challenging.

Because writing such performant code may be challenging, frameworks, libraries, and/or application programming interfaces (APIs) may be used to mitigate some of the challenges. In some embodiments, such frameworks, libraries, and APIs may offer a set of highly optimized, pre-built modules that an application developer can use without having to worry about the finer details of the process. However, tightly optimized code often runs contrary to the requirements of flexibility and maintainability. It either offers a feature set that is too narrow and doesn't have wide appeal, or is too arcane and makes life difficult for those who actually build it.

In some embodiments, a multimedia processing framework or library may be designed around the concept of re-usable blocks that can be wired together in a graph or pipeline. The input image or video is at the source end, and the output is on the sink end. Each block may be a separate file or module in the framework's source code, and is separately compiled into machine-readable code for an entire family of computer architectures when the framework is made available to its users (i.e., the application developers). In some cases, some number of such blocks have a highly optimized loop that iterates over each pixel.

When an application wires these blocks into a pipeline, the result may be a sequence of such loops with each block making one pass over all the pixels in the image. This may lead to some problems; (a) repeatedly iterating over the pixels of an image is inefficient in terms of memory access. Accessing a computer's main memory or random-access memory (RAM) may be slower than accessing the various memory caches. When a pixel is read, the computer automatically loads its neighboring pixels into a memory cache making subsequent pixels taster to read; and similarly for writing. In some embodiments, the caches are much smaller than the RAM, so the pixels eventually get evicted from the cache, making room for more recent accesses. Therefore, repeatedly iterating over the entire image serially for each block means that the same pixel is loaded and evicted multiple times. Reducing the number of such iterations can have a significant effect on speed; and (b) subsequent blocks in the pipeline might have code that negates the desire to perform operations of prior blocks, and/or multiple blocks may calculate the same expressions over and over again independent of each other. Since each block is separately compiled as part of a generic framework before the application is written, there is no prior knowledge of how each block might be arranged in a pipeline, nor is there the possibility of sharing the results of these common expressions. Avoiding any extra work in loops that run millions or billions of times will not only reduce the number of processor instructions, but also reduce memory traffic.

Furthermore, because the framework or library is compiled into machine-readable code only once for an entire family of computer architectures means that it is held back by the slowest member in the family. In some embodiments, special instructions and capabilities introduced in newer generations of the framework or library cannot be exploited because those won't work on older machines.

Advantageously, the embodiments described herein address the above, and other challenges by providing a novel optimization technique that leverages rum-time knowledge of the application and the underlying hardware, and describing how system can be built to expose such optimization to an application developer without sacrificing the flexibility and maintainability of the library or framework e.g., without introducing new programming languages). In some examples, such embodiments may include receiving multiple copies of each block of a media pipeline (e.g., a first copy may be a high-level representation of the respective block and a second copy may be a machine-readable copy). A run-time-optimized media pipeline may then be generated using the first copy and the second copy. Processing logic of the run-time optimized media pipeline may utilize the first and second copy to optimize a set and order of pipeline blocks, such that when executed, the operations corresponding to the blocks work together efficiently. In some examples, individual operations of various blocks may be deconstructed and recombined into new blocks. Advantageously, the embodiments described herein allow computer systems (e.g., software and hardware) to be more efficient in processing workloads by better taking advantage of optimized workflows and operations, as described herein.

The embodiments herein have wide-reaching implications for existing applications, such as Darktable® and GIMP®, if incorporated into existing frameworks like GEGL. Other, non-destructive image and video editing applications, such as Lightroom®, Premiere Pro®, and Aperture®, would also be improved if incorporated.

FIG. 1 depicts a first high-level component diagram of an illustrative example of a computer system architecture 100, in accordance with one or more aspects of the present. disclosure. One skilled in the art will appreciate that other computer system architectures 100 are possible, and that the implementation of a computer system utilizing examples of the invention are not necessarily limited to the specific architecture depicted by FIG. 1. Worth noting, although FIG. 1 illustrates a virtual-machine system to perform the operations described herein, other non-virtual-machine systems are contemplated, as will be described.

In one embodiment, a virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc.

As shown in FIG. 1, computer system architecture 100 includes a host system 105. The host system 105 includes one or more processing devices 160 (e.g., central processing units, graphical processing units, etc.), main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to processing device 160. It should be noted that although, for simplicity, a single processing device 160, main memory 170, storage device 180, and device 190 are depicted in FIG. 1, other embodiments of host system 105 may include a plurality of CPUs, GPUs, memories, storage devices, and devices.

The host system 105 may be a server, a mainframe, a workstation, a personal computer (PC), a mobile phone, a palm-sized computing device, etc. Host system 105 may additionally include one or more virtual machine (VM), e.g., high-performance 130, and host operating system (OS) 120. It should be noted that like every other component of system 100, host OS 120 is optional for hardware-based hypervisors). VM 130 is a software implementation of a machine that executes programs as though it was an actual physical machine. Host OS 120 and/or hypervisor 125 manages the hardware resources of the computer system and provides functions such as inter-process communication, scheduling, memory management, and so forth.

VM 130 may include a guest operating system (OS) 135 that handles the execution of applications (e.g., workloads) within the virtual machine. Guest OS 135 may control a device 190 through device driver 136. It should be noted that although, for simplicity, a single VM 130 is depicted in FIG. 1, host system 105 may host multiple VMs 130.

Host OS 120 may include a hypervisor 125, which provides a virtual operating platform for VMs 130 and manages their execution. It should be noted that in some alternative implementations, hypervisor 125 may be external to host OS 120, rather than embedded within host OS 120, or may replace host OS 120.

In one embodiment, guest OS 135 may include run-time media optimizer 136. In another embodiment, run-time media optimizer 136 may be included in host OS 120, or elsewhere in the system (e.g., on processing device 160 and/or device 190). As will be described in detail, run-time media optimizer 136 may be responsible for performing the run-time optimization tasks described herein. In one embodiment, run-time media optimizer 136 is built into a just-in-time (JIT) compiler. In another embodiment, run-time media optimizer 136 separate and distinct from a JIT compiler.

Figure 2:
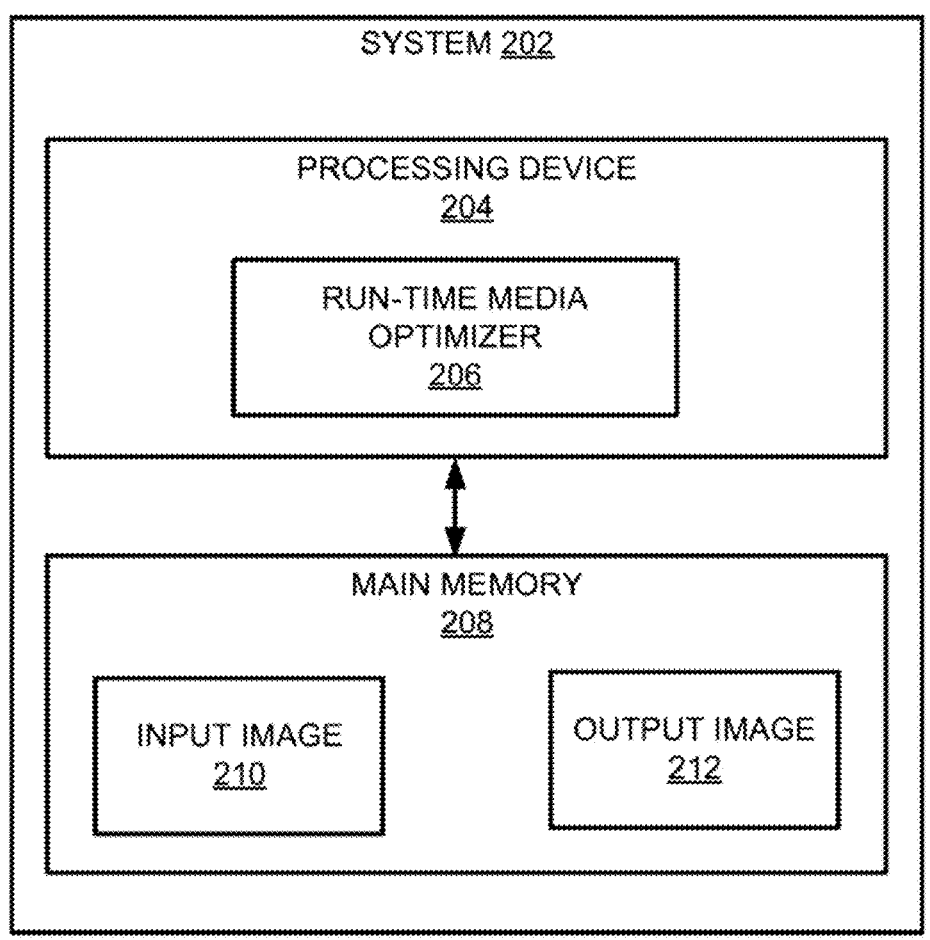
FIG. 2 depicts a second high-level component diagram of an example computer system architecture, in accordance with one or more aspects of the present disclosure.

FIG. 2 depicts a second high-level component diagram of an illustrative example of a computer system architecture 200, in accordance with one or more aspects of the present disclosure. One skilled in the art will appreciate that other computer system architectures 200 are possible, and that the implementation of a computer system utilizing examples of the invention are not necessarily limited to the specific architecture depicted by FIG. 2.

In one embodiment, computer system architecture 200 represents a subset of the VM computer system architecture 100 of FIG. 1. In another embodiment, computer system architecture 200 illustrates a portion of a non-VM computer system architecture. The system 202 may be a server, a mainframe, a workstation, a personal computer (PC), a mobile phone, a palm-sized computing device, etc. As described herein, system 202 may additionally include one or more VMs.

As shown in FIG. 2, computer system architecture 200 includes a system 202. The system 202 includes one or more central processing units (e.g., processing device 204) and main memory 208, which may include volatile memory devices (e.g., random access memory (RAM)), non-volatile memory devices (e.g., flash memory) and/or other types of memory devices. In certain implementations, main memory 270 may be non-uniform access (NUMA), such that memory access time depends on the memory location relative to processing device 204. In one embodiment, main memory 208 stores input image 210, to be received by run-time media optimizer 206, and output image 212 generated by run-time media optimizer 206. In various embodiments, main memory 208 is not large enough to store the entirety of input image 210 or output image 212, and instead stores only a subset of pixels of input image 210 or output image 212.

It should be noted that although, for simplicity, a single processing device 204 and main memory 270 are depicted in FIG. 2, other embodiments of system 202 may include a plurality of CPUs, GPUs, memories, storage devices, and devices. In one embodiment, processing device 204 may include run-time media optimizer 206. In other embodiments, run-time media optimizer may be included in other components of system 202, or external to system 202. For example, in one embodiment, run-time media optimizer 206 is built into a JIT compiler. In another embodiment, run-time media optimizer 206 separate and distinct from a JIT compiler.

Figure 3:
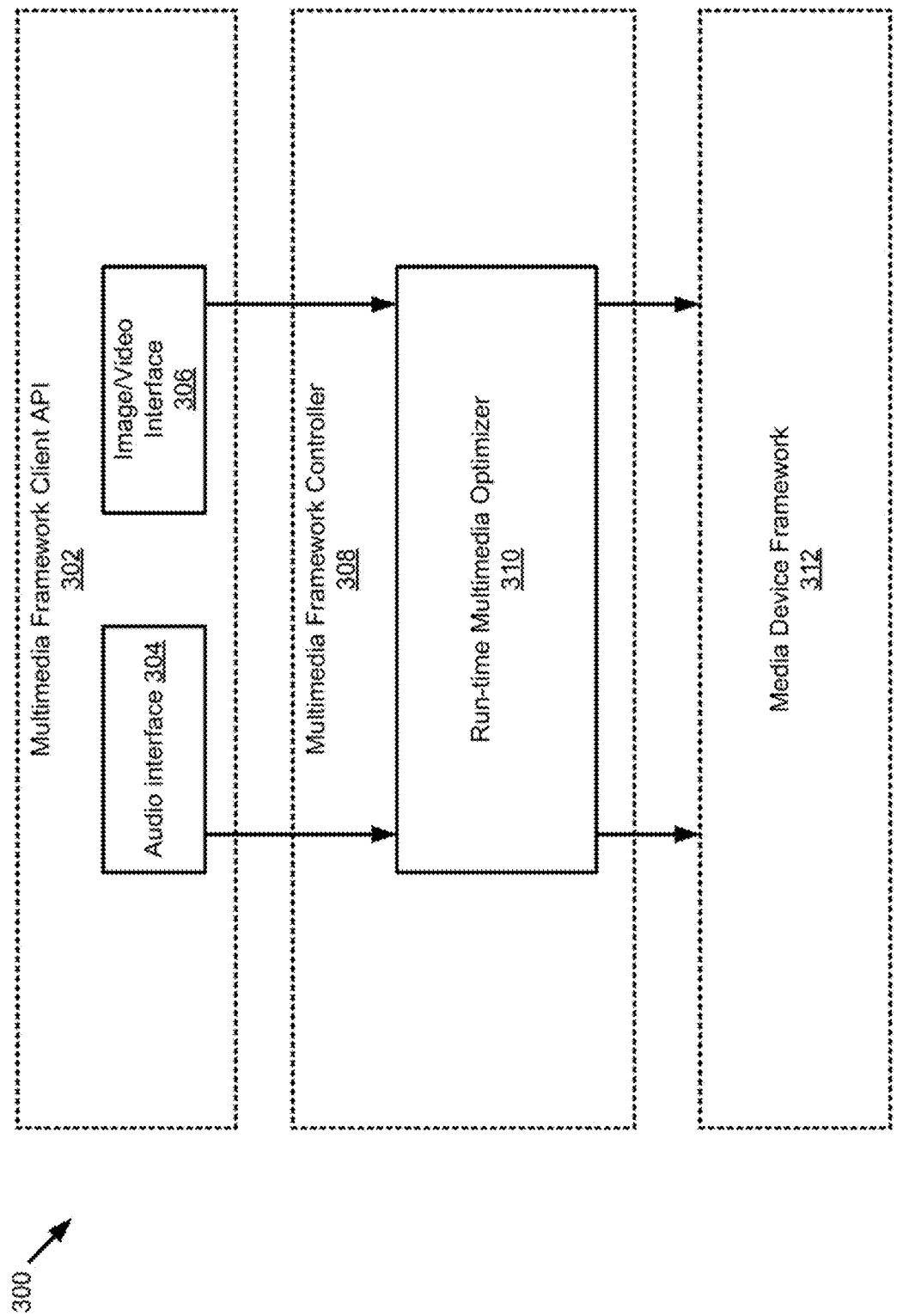
FIG. 3 depicts a multimedia framework, in accordance with one or more aspects of the present disclosure.

FIG. 3 depicts a multimedia framework 300, in accordance with one or more aspects of the present disclosure. In one embodiment, multimedia framework 300 may be contained on a single device (e.g., a client device) or spread access multiple devices in one or more systems.

In one embodiment, multimedia framework 300 includes a multimedia framework client API 302, including an audio interface 304 and/or an image/video interface 306. In one embodiment, the multimedia framework client API 302 and included audio interface 304 and/or an image/video interface 306 allow a client device to access the multimedia framework 300 to perform modifications to any form of media. In one embodiment, media may be recorded, played, and sent to the multimedia framework controller 308 via the respective interfaces in multimedia framework client API 302.

In one embodiment, multimedia framework controller 308 includes run-time multi-media optimizer 310. Multimedia framework controller 308, may, using an optimized pipeline generated by run-time multimedia optimizer 310, modify (e.g., apply modifications/filters) convert (e.g., to a different filed format), interpret, and play audio and video (image) data. In one embodiment, run-time multimedia optimizer 310 generates an optimized pipeline by generating or receiving two copies of each block in a media pipeline, generating or receiving annotations in the source code in one or more of each of the two copies of the blocks, and using the two copies of each block and the annotated source code to generate the optimized pipeline. Additional details describing, more specifically, how this is accomplished are provided with respect to FIGS. 4-7 below.

The resultant data from the multimedia framework controller 308 can then be directed to one or more sinks such as a file, or directly to a screen or lower-level device driver. In one embodiment, the media device framework 312 is the layer below the multimedia framework controller 308 and above the hardware. It provides a layer of abstraction for the audio and video hardware.

Figure 4:
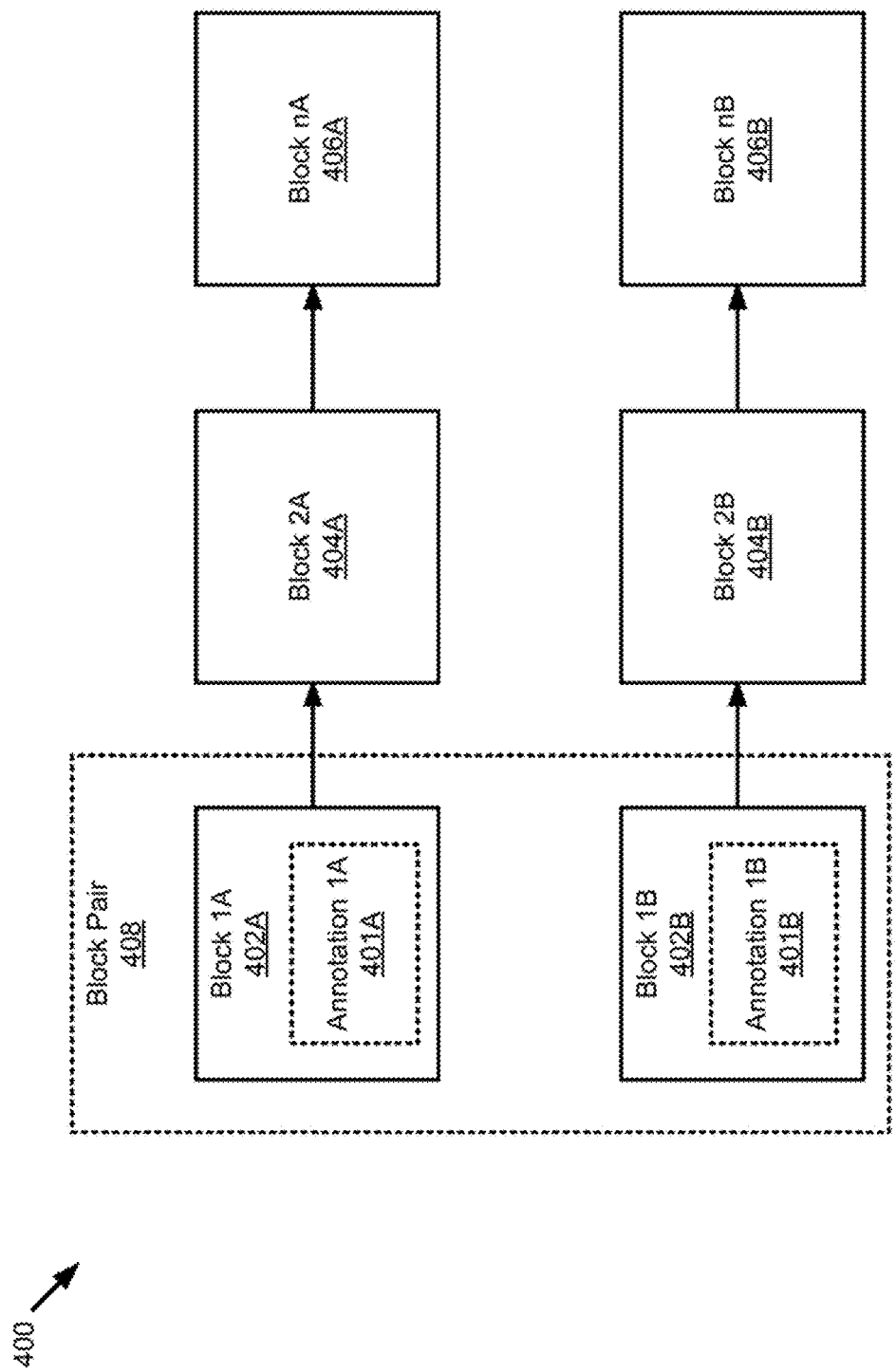
FIG. 4 depicts a media pipeline, in accordance with one or more aspects of the present disclosure.

FIG. 4 depicts a media pipeline 400, in accordance with one or more aspects of the present disclosure. As described herein, media pipelines may include one or more blocks discrete processing logic that performs a specified function on the media. Examples of such blocks may include blocks related to the modification of brightness, contrast, saturation, sharpness, color, etc. in an image (or video frame). In one embodiment, filters, such as those available on popular mobile applications, may make a variety of adjust to an image by simply applying the single filter. Filters may be represented as multiple blocks, whose processing logic is used to collectively modify the image according to the presets defined by the filter. As such, blocks 1-$n$ represent separate adjustments to be applied to an image individually, or a collective set of adjustments (e.g., a filter) to be applied to the image in concert.

In one embodiment, blocks 1-$n$ are serially applied to an image. For example, if an image to is have its brightness, contrast, and saturation modified, the brightness of each of the pixels of the image may first be modified by block, then the contrast of each of the pixels may be modified by block 2, and finally the saturation of each of the pixels may be modified by block n. Such serial modification may be disadvantageous, as it does not make efficient use of caching. By the time block 1 is finished modifying the last pixel of the image, the first pixel of the image has been evicted from memory and thus block 2 must retrieve the pixel from a less efficient source. Furthermore, such serialization does not allow for the combination and/or elimination of operations that are performed by each of the blocks separately, as each block operates within its own silo. Advantageously, the embodiments describe herein address these drawbacks and others.

Referring to FIG. 4, two copies of each block of a media pipeline may be generated. For example, block 1A 204A and block 1B 401B may be two copies of a single block, and form a block pair 408. The same can be said for blocks 2A 404A and 2B 404B, and blocks nA 406A and nB 406B.

As described herein, the media pipeline framework's build may output two copies of each block—a fully machine-readable copy (e.g., block 1A), and a higher-level representation block (e.g., 1B) to go along with it. In one embodiment, this does not require re-writing the source code of each block offered by the framework or maintaining multiple variants of the sources. Usually there are many dozens of such blocks. Having this complexity limited to the build system is a significant benefit for those software developers who are building and maintaining the framework itself. In one embodiment, both copies of the blocks may be generated by a developer. In another embodiment, a computer system may be utilized (e.g., via machine learning) to generate one copy from the other. In yet another embodiment, each of the copies may be dynamically generated (e.g., without human interaction) based on the functionality desired.

In one embodiment, one or both of the copies in each block pair (e.g., 408) may include source code annotations.

Such annotation may provide more explicit descriptions and/or instructions about the nature of the loops and the code that runs for each output pixel. Advantageously, framework hierarchies of abstract base classes that are implemented by the leaf-level blocks could be leveraged to provide such annotations. In one embodiment, annotations are hand-coded by developers. In other embodiments, annotations may be dynamically created by computer systems (e.g., via machine learning). In various embodiments, such annotations may be in the same language/form as the underlying source code or in a different language/form altogether. In one embodiment, once the two copies of the blocks have been generated, they can be used to generate a run-time-optimized pipeline, as shown with respect to FIG. 5.

Figure 5:
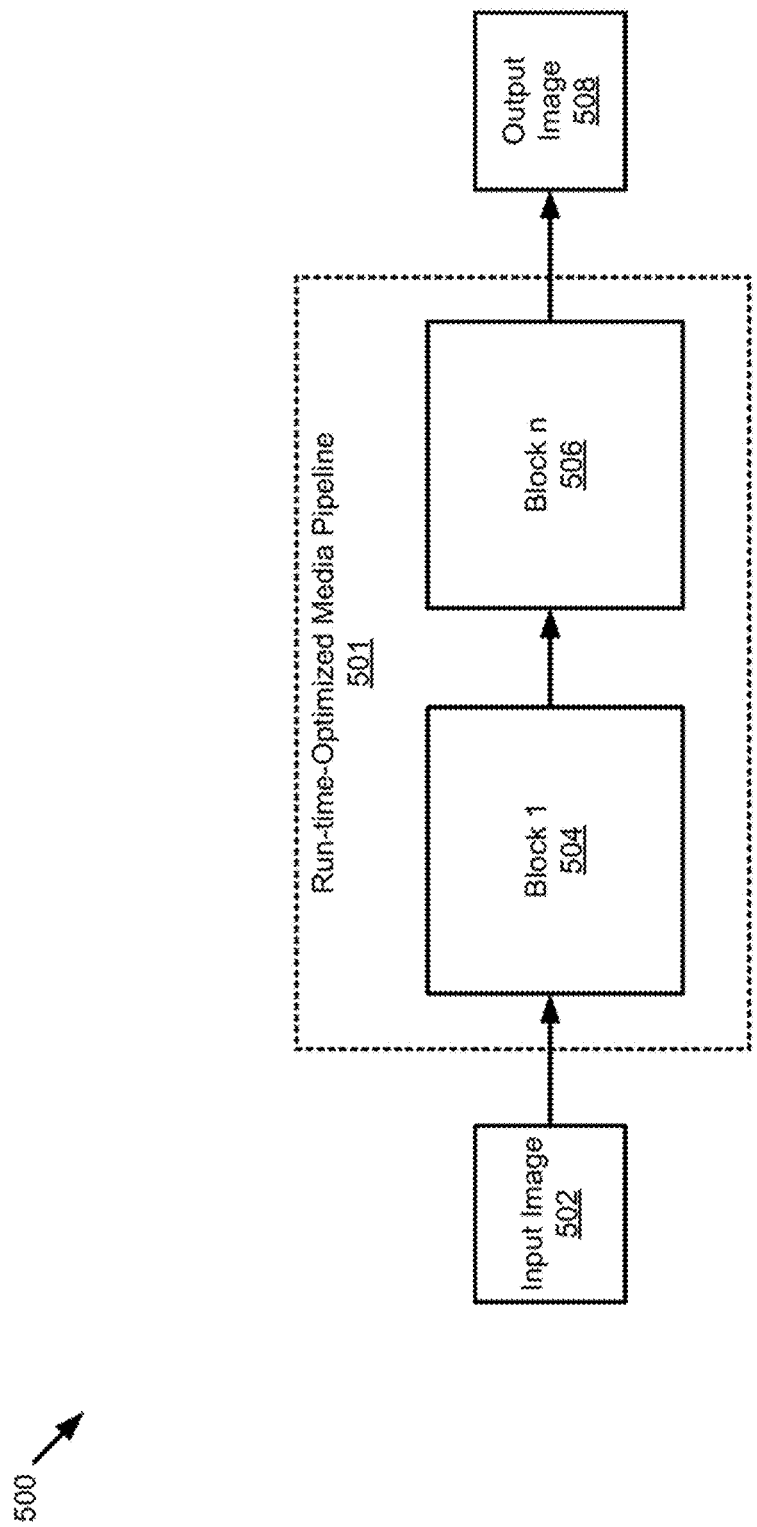
FIG. 5 depicts a run-time-optimized media pipeline, in accordance with one or more aspects of the present disclosure.

FIG. 5 depicts a run-time-optimized media pipeline 500, in accordance with one or more aspects of the present disclosure. As described above, once the application has generated or received each of the block copies, it can exploit the availability of the higher-level representation of the blocks to fuse together multiple consecutive smaller loops into a much bigger single loop that may then be compiled into machine code at run-time using a just-in-time or JIT compiler. Advantageously, in this case a single loop won't make multiple passes over the pixels in the image, and the compiler will have the opportunity to remove useless instructions. Since the compiler is invoked at run-time on the specific machine where the code is to be run, it can aggressively optimize its output to exactly match the user's computer without worrying about compatibility with other hardware variants. As shown, an input image 502 may be sent to/received by the run-time-optimized media pipeline 501, using which an output image 508 is generated. Blocks 1 504 and n 506 represent the optimized blocks of the pipeline, which may or may not include the same number of blocks as the original pipeline.

Assuming that the name of the framework is FOO and is written in C, see the attached draft for an example of how such a media processing framework may look to an application developer.

```
FooPipeline *pipeline = NULL;
FooBlock *exposure;
FooBlock *load;
FooBlock *noise_reduction;
FooBlock *sink;
/* build a pipeline that loads an image, changes its exposure,
 * reduces noise, and then saves the result as a PNG
 */
pipeline = foo_pipeline_new ( );
load = foo_pipeline_new_child (pipeline,"operation", "foo:load", "path", /* input path as C
string */, NULL);
exposure = foo_pipeline_new_child (pipeline,"operation", "foo:exposure", "black-level",
0.03, NULL);
noise_reduction = foo_pipeline_new_child (pipeline,"operation", "foo:noise-reduction",
"iterationsl", 10, NULL);
sink = foo_pipeline_new_child (pipeline,"operation", "foo:png-save", "bitdepth", 8, "path",
/* output path as C string */, NULL);
foo_block_link_many (load, exposure, noise_reduction, sink, NULL);
/* fuse all the blocks together and JIT */
foo_pipeline_seal (pipeline);
/* run the pixels through the pipeline and process them */
foo pipeline process (pipeline).;
```

Compiling and optimizing any piece of code may have some cost—it is neither free nor instantaneous. It takes some time, consumes memory bandwidth, processor cycles, and power. The more aggressive the optimization, the more the cost. Although the cost of JIT compiling a pipeline may be relatively insignificant, only the application developer knows if, or how much, can be afforded. It should be noted that the JIT-compiled representation of the pipeline (e.g., 501) may get invalidated by changes to the pipeline. It would depend both on how invasive the optimization and the change was. Or in other words, aggressively optimizing a frequently changing pipeline may increase the JIT compilation overhead. This may or may not be offset by the resulting speed gained from the effort.

Disabling JIT compilation might also be useful when debugging and profiling the software. Therefore, in some embodiments, the application may have some control over when and which parts of the pipeline are sealed for JIT compilation. In another embodiment, the framework may offer a setting to let the application modify the extent of this run-time optimization depending on available resources and how often the pipeline can change. Here are some possible variations that this setting can offer:

(a) For a more static pipeline, the application can request that the arguments for each block be treated as constant expressions. This way they will get optimized away and not be repeatedly re-evaluated when the pixels flow through it. This can happen if the user is not actively editing the input image or video, and the result of the existing edits are merely being rendered, printed, saved, etc.

(b) If the arguments are expected to change frequently, then it may be better for the application to not mark them as constants to avoid repeatedly incurring the overhead compiling the pipeline. This can happen if the user is in the process of editing the input media.

(c) If parts of the pipeline are expected to be tweaked by the user, the application can exclude them from optimization and seal/optimize parts of the pipeline that are expected to be unchanged during the user interaction. This can be useful because editing an optimized section of the pipeline may annul the optimization.

It is possible that some run-time environments will not support JIT compilation either due to lack of resources on tiny embedded hardware or some other limitation of the system. In such cases, requests to seal the pipeline will fail. Fortunately for the users of the framework, the framework described herein can gracefully fall back to using the separate pre-built machine-readable representations of the blocks as before, whenever an unsealed pipeline is used to process the pixels.

Advantageously, the complexity of JIT compilation and processing the pipeline depending on whether it is sealed or not may be limited to the framework's core pipeline component. The many dozens of media processing blocks will not be affected by these details.

From the application developer's perspective, it is only one API call to enable the optimization, and possibly another one change the default optimization level. All esoteric details are nicely wrapped and hidden away deeper within the framework. This means that this run-time optimization can be retrofitted to an existing graph or pipeline based media processing framework, and can be easily enabled in applications currently using it.

Figure 6:
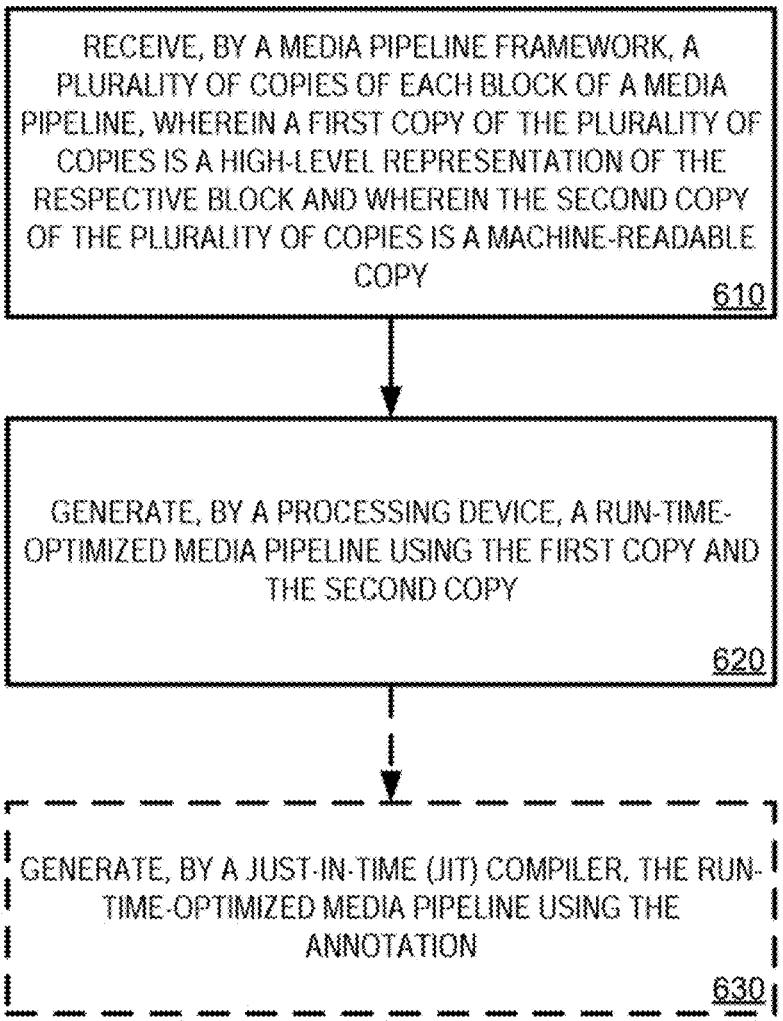
FIG. 6 is a first flow diagram of a method of run-time optimization of media pipelines, in accordance with some embodiments of the present disclosure.

FIG. 6 is a first flow diagram of a method 600 of run-time optimization of media pipelines, in accordance with some embodiments of the present disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 600 may be performed by run-time media optimizer as described herein.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Referring to FIG. 6, at block 610 processing logic receives, by a media pipeline framework (e.g., by a run-time media optimizer), a plurality of copies of each block of a media pipeline. In one embodiment, processing logic receives two copies of the media pipeline, wherein a first copy of the plurality of copies is a high-level representation of the respective block and wherein the second copy of the plurality of copies is a machine-readable copy. In another embodiment, processing logic received more than two copies of each block.

At block 620, processing logic generates, by a processing device, a run-time-optimized media pipeline using the first copy and the second copy. In a variety of embodiments, the generated run-time-optimized pipeline may include any number of optimizations, as described herein. For example, the optimized pipeline may consolidate loops of several blocks into a single loop in a single block, remove duplicative code, identify and tag variables and constants across multiple blocks, change the order of operations across multiple blocks, etc.

In one embodiment, at least one of the first copy or the second copy include an annotation indicating a description of code that rims for each output pixel of an output image. Advantageously, this may allow a JIT compiler to best optimize the underlying blocks to generate the optimized pipeline (block 630).

In one embodiment, generating the run-time optimized media pipeline includes combining two or more blocks (or subsets of the two or more blocks) of the media pipeline based on the annotation. In another embodiment, generating the run-time optimized media pipeline includes eliminating a subset of a block or an entire block of the media pipeline based on the annotation. In another embodiment, generating the run-time optimized media pipeline includes designating an argument of a block as a constant or a variable across multiple blocks in the optimized pipeline. In yet another embodiment, generating the run-time optimized media pipeline includes excluding a subset of a block, or an entire block, from optimization (e.g., prevent a portion of a block, or an entire block, from being included in an optimization process).

Figure 7:
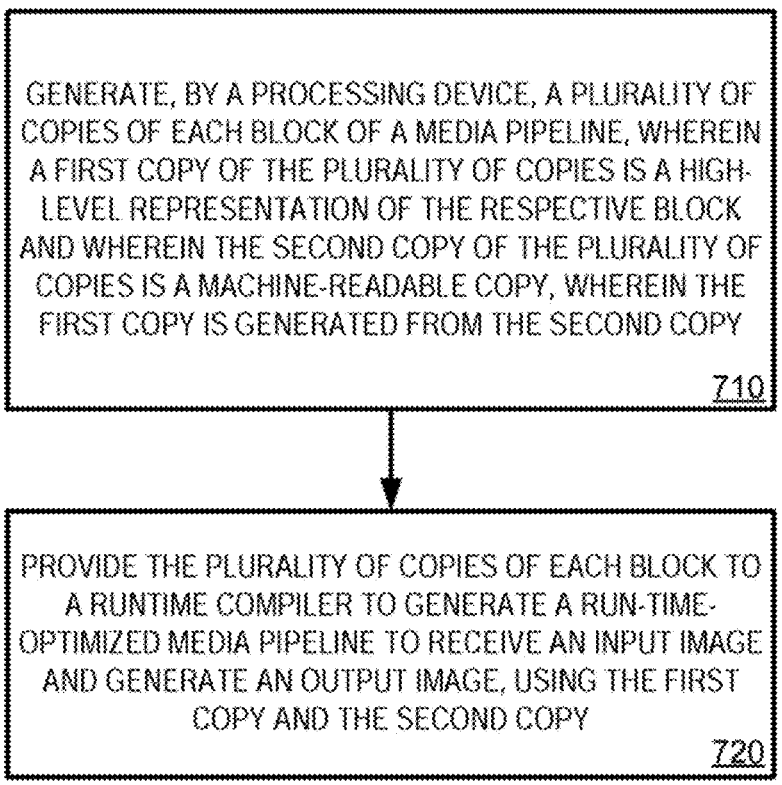
FIG. 7 is a second flow diagram of a method of run-time optimization of media pipelines, in accordance with some embodiments of the present disclosure.

FIG. 7 is a second flow diagram of a method 700 of run-time optimization of media pipelines, in accordance with some embodiments the present disclosure. The method 700 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 600 may be performed by run-time media optimizer as described herein.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring to FIG. 7, at block 710 processing logic generates, by a processing device (e.g, a GPU), a plurality of copies of each block of a media pipeline. In one embodiment, processing logic generates two copies of the media pipeline, wherein a first copy of the plurality of copies is a high-level representation of the respective block and wherein the second copy of the plurality of copies is a machine-readable copy. In another embodiment, processing logic generates more than two copies of each block. In one embodiment, the first copy may be generated from the second copy. In another embodiment, neither copy is venerated from the other copy. In one embodiment, at least one of the first copy or the second copy include an annotation indicating a description of code that runs for each output pixel of the output image. In another embodiment, only the first copy includes an annotation.

At block 720, processing logic provides the plurality of copies of each block to a run-time compiler to generate a run-time-optimized media pipeline to receive an input image and generate an output image, using, the first copy and the second copy. In one embodiment, the run-time compiler is a JIT compiler, and the annotation instructs the JIT compiler to generate the run-time-optimized media pipeline. In a variety of embodiments, to generate the run-time-optimized media pipeline, the annotation instructs the JIT compiler to combine two or more blocks of the media pipeline, eliminate a subset of a block of the media pipeline, designate an argument of a block as a constant, or exclude a subset of a block from optimization.

Worth noting, although the term "instructs the JIT compiler" is used throughout, it is anticipated that the annotations may be high-level descriptions of the underlying source-code functionality. Such annotations do not instruct the compiler, but simply provide the compiler with context that allows the compiler to best optimize a media pipeline. In other words, annotations need not actively instruct a compiler to perform particular operations, although that is possible. Instead, annotations may be instructive they may provide description and context that allow the compiler to modify underlying source code as it sees fit.

Figure 8:
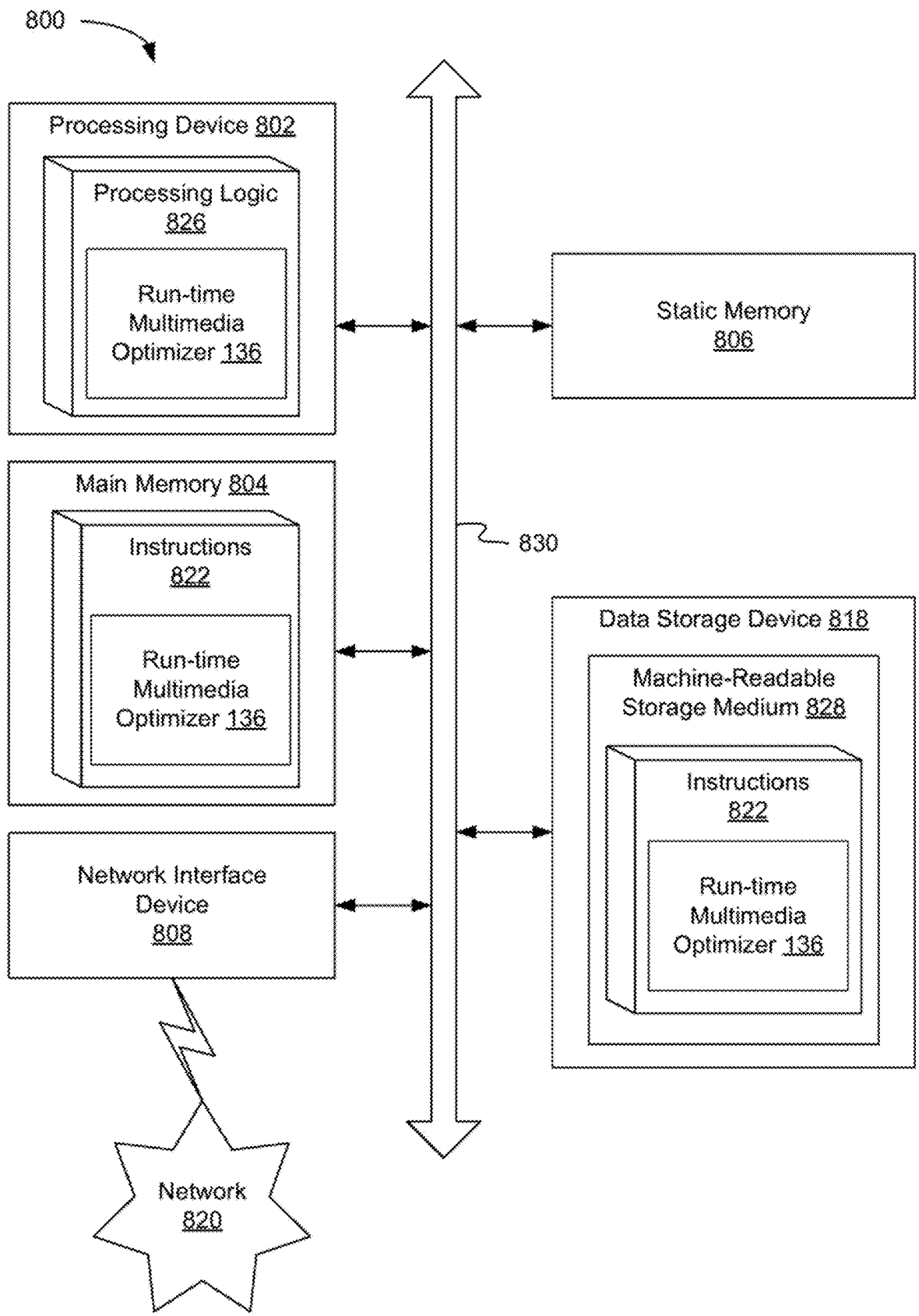
FIG. 8 depicts a block diagram of an illustrative computer system operating in accordance with examples of the invention.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a host system, such as host system 105/205 configured to perform the operations described herein.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal es. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), graphics processing unit (GPU), network processor, or the like. The processing device 802 is configured to execute/modify processing logic 826, which may be one example of configuration 127 of FIG. 1, for performing the operations and steps discussed herein.

The data storage device 818 may include a non-transitory computer-readable storage medium 828, on which is stored one or more set of instructions 822 (e.g., software) embodying any one or more of the methodologies of functions described herein, including instructions to cause the processing device 802 to modify configuration 127. The instructions 822 may also reside, completely or at least partially, within the main memory 804 or within the processing device 802 during execution thereof by the computer system 800 the main memory 804 and the processing device 802 also constituting machine-readable storage media. The instructions 822 may further be transmitted or received over a network 820 via the network interface device 808.

The non-transitory computer-readable storage medium 828 may also be used to store instructions to perform a method for multi-level task debugging, as described herein. While the non-transitory computer-readable storage medium 828 is shown in an exemplary embodiment to be a single medium, the term "computer-readable storage medium" should be taken to include a single medium or multiple media (e.g., a centralized or distributed database, or associated caches and servers) that store the one or more sets of instructions. A computer-readable medium includes any mechanism for storing information in a form (e.g., software, processing application) readable by a machine (e.g., a computer). The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Other computer system designs and configurations may also be suitable to implement the systems and methods described herein. The following examples illustrate various implementations in accordance with one or more aspects of the present disclosure.

Example 1 is a method, comprising: receiving, by a media pipeline framework, a plurality of copies of each block of a media pipeline, wherein a first copy of the plurality of copies is a high-level representation of the respective block and wherein the second copy of the plurality of copies is a machine-readable copy; and generating, by a processing device, a run-time-optimized media pipeline using the first copy and the second copy.

Example 2 is the method of Example 1, wherein at least one of the first copy or the second copy comprise an annotation indicating a description of code that runs for each output pixel of an output image.

Example 3 is the method of Example 2, further comprising generating, by a just-in-time (JIT) compiler, the run-time-optimized media pipeline using the annotation.

Example 4 is the method of Example 3, wherein generating the run-time optimized media pipeline comprises combining two or more blocks of the media pipeline based on the annotation.

Example 5 is the method of Example 3, wherein generating the run-time optimized media pipeline comprises eliminating a subset of a block of the media pipeline based on the annotation.

Example 6 is the method of Example 3, wherein generating the run-time optimized media pipeline comprises designating an argument of a block as a constant.

Example 7 is the method of Example 3, wherein generating the run-time optimized media pipeline comprises excluding a subset of a block from optimization.

Example 8 is a system, comprising: a memory to store an input image and an output image; and a processing device, operatively coupled to the memory, to: generate a plurality of copies of each block of a media pipeline, wherein a first copy of the plurality of copies is a high-level representation of the respective block and wherein the second copy of the plurality of copies is a machine-readable copy; and provide the plurality of copies of each block to a run-time compiler to generate a run-time-optimized media pipeline to receive the input image and generate the output: image, using the first copy and the second copy.

Example 9 is the system of Example 8, wherein at least one of the first copy or the second copy comprise an annotation indicating a description of code that runs for each output pixel of the output image.

Example 10 is the system of Example 9, wherein the run-time compiler is a just-in-time (JIT) compiler, and wherein the annotation instructs the JIT compiler to generate the run-time-optimized media pipeline.

Example 11 is the system of Example 10, wherein the annotation instructs the JIT compiler to combine two or more blocks of the media pipeline.

Example 12 is the system of Example 10, wherein the annotation instructs the JIT compiler to eliminate a subset of a block of the media pipeline.

Example 13 is the system of Example 10, wherein the annotation instructs the JIT compiler to designate an argument of a block as a constant.

Example 14 is the system of Example 10, wherein the annotation instructs the JIT compiler to exclude a subset of a block from optimization.

Example 15 is a non-transitory computer-readable storage medium including instructions that, when executed by a processing device of a source host system, cause the processing device to: receive, by a media pipeline framework, a plurality of copies of each block of a media pipeline, wherein a first copy of the plurality of copies is a high-level representation of the respective block and wherein the second copy of the plurality of copies is a machine-readable copy; and generate, by the processing device, a run-time-optimized media pipeline to receive an input image and generate an output image, using the first copy and the second copy.

Example 16 is the non-transitory computer-readable storage medium of Example 15, wherein at least one of the first copy or the second copy comprise an annotation indicating a description of code that runs for each output pixel of the output image.

Example 17 is the non-transitory computer-readable storage medium of Example 16, the processing device further to generate, by a just-in-time (JIT) compiler, the run-time-optimized media pipeline using the annotation.

Example 18 is the non-transitory computer-readable storage medium of Example 16, wherein to generate the run-time optimized media pipeline the processing device is to combine two or more blocks of the media pipeline based on the annotation.

Example 19 is the non-transitory computer-readable storage medium of Example 16, wherein to generate the run-time optimized media pipeline the processing device is to eliminate a subset of a block of the media pipeline based on the annotation.

Example 20 is the non-transitory computer-readable storage medium of Example 16, wherein to generate the run-time optimized media pipeline the processing device is to designate an argument of a block as a constant.

Example 21 is the non-transitory computer-readable storage medium of Example 16, wherein to generate the run-time optimized media pipeline the processing device is to exclude a subset of a block from optimization.

Example 22 is a method, comprising: generating, by a processing device, a plurality of copies of each block of a media pipeline, wherein a first copy of the plurality of copies is a high-level representation of the respective block and wherein the second copy of the plurality of copies is a machine-readable copy, wherein the first copy is generated from the second copy; and providing the plurality of copies of each block to a run-time compiler to generate a run-time-optimized media pipeline to receive an input image and generate an output image, using the first copy and the second copy.

Example 23 is the method of Example 22, wherein at least one of the first copy or the second copy comprise an annotation indicating a description of code that runs for each output pixel of the output image.

Example 24 is the method of Example 23, wherein the run-time compiler is a just-in-time (JIT) compiler, and wherein the annotation instructs the JIT compiler to generate the run-time-optimized media pipeline.

Example 25 is the method of Example 24, wherein the annotation instructs the JIT compiler to combine two or more blocks of the media pipeline, eliminate a subset of a block of the media pipeline, designate an argument of a block as a constant, or exclude a subset of a block from optimization.

Example 26 is a system, comprising: a memory to store an input image and an output image; and a processing device, operatively coupled to the memory, to: receive, by a media pipeline framework, a plurality of copies of each block of a media pipeline, wherein a first copy of the plurality of copies is a high-level representation of the respective block and wherein the second copy of the plurality of copies is a machine-readable copy; and generate, by the processing device, a run-time-optimized media pipeline to receive the input image and generate the output image, using the first copy and the second copy.

Example 27 is the system of Example 26, wherein at least one of the first copy or the second copy comprise an annotation indicating a description of code that runs for each output pixel of the output image.

Example 28 is the system of Example 27, the processing device further to generate, by a just-in-time (JIT) compiler, the run-time-optimized media pipeline using the annotation.

Example 29 is the system of Example 28, wherein to generate the run-time optimized media pipeline the processing device is to combine two or more blocks of the media pipeline.

Example 30 is the system of Example 28, wherein to generate the run-time optimized media pipeline the processing device is to eliminate a subset of a block of the media pipeline.

Example 31 is the system of Example 28, wherein to generate the run-time optimized media pipeline the processing device is to designate an argument of a block as a constant.

Example 32 is the system of Example 29, wherein to generate the run-time optimized media pipeline the processing device is to exclude a subset of a block from optimization based on the annotation.

Example 33 is an apparatus comprising: means for receiving a plurality of copies of each block of a media pipeline, wherein a first copy of the plurality of copies is a high-level representation of the respective block and wherein the second copy of the plurality of copies is a machine-readable copy; and means for providing an API for generating a run-time-optimized media pipeline using the first copy and the second copy.

Example 34 is the apparatus of Example 33, wherein at least one of the first copy or the second copy comprise an annotation indicating a description of code that runs for each output pixel of an output image.

Example 35 is the apparatus of Example 34, further comprising means for generating, by a just-in-time (JIT) compiler, the run-time-optimized media pipeline using the annotation.

Example 36 is the apparatus of any of Examples 34-35, wherein generating the run-time optimized media pipeline comprises combining two or more blocks of the media pipeline based on the annotation.

Example 37 is the apparatus of any of Examples 34-36, wherein generating the run-time optimized media pipeline comprises eliminating a subset of a block of the media pipeline based on the annotation.

Example 38 is the apparatus of any of Examples 34-37, wherein generating the run-time optimized media pipeline comprises designating an argument of a block as a constant.

Example 39 is the apparatus of any of Examples 34-38, wherein generating the run-time optimized media pipeline comprises excluding a subset of a block from optimization.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
    receiving, by a media pipeline framework, a plurality of copies of each block of a media pipeline, wherein a first copy of the plurality of copies is a high-level representation of a respective block, wherein a block comprises discrete processing logic that performs a specified function on media of the media pipeline, wherein the high-level representation comprises descriptions of underlying source-code, and wherein a second copy of the plurality of copies is a machine-readable copy of the respective block, and wherein the high-level representation of the respective block differs from the machine-readable copy of the respective block; and
    generating, by a processing device, a run-time-optimized media pipeline using the first copy being the high-level representation and the second copy being the machine readable copy.

2. The method of claim 1, wherein at least one of the first copy or the second copy comprise an annotation indicating a description of code that runs for each output pixel of an output image.

3. The method of claim 2, further comprising generating, by a just-in-time (JIT) compiler, the run-time-optimized media pipeline using the annotation.

4. The method of claim 3, wherein generating the run-time optimized media pipeline comprises combining two or more blocks of the media pipeline based on the annotation.

5. The method of claim 3, wherein generating the run-time optimized media pipeline comprises eliminating a subset of a block of the media pipeline based on the annotation.

6. The method of claim 3, wherein generating the run-time optimized media pipeline comprises designating an argument of a block as a constant.

7. The method of claim 3, wherein generating the run-time optimized media pipeline comprises excluding a subset of a block from optimization.

8. A system, comprising:
    a memory to store an input image and an output image; and
    a processing device, operatively coupled to the memory, to:
        generate a plurality of copies of each block of a media pipeline, wherein a first copy of the plurality of copies is a high-level representation of a respective block,
        wherein a block comprises discrete processing logic that performs a specified function on media of the media pipeline, wherein the high-level representation comprises descriptions of underlying source-code, and wherein a second copy of the plurality of copies is a machine-readable copy of the respective block, and wherein the high-level representation of the respective block differs from the machine-readable copy of the respective block; and
        provide the plurality of copies of each block to a run-time compiler to generate a run-time-optimized media pipeline to receive the input image and generate the output image, using the first copy being the high-level representation and the second copy being the machine readable copy.

9. The system of claim 8, wherein at least one of the first copy or the second copy comprise an annotation indicating a description of code that runs for each output pixel of the output image.

10. The system of claim 9, wherein the run-time compiler is a just-in-time (JIT) compiler, and wherein the annotation instructs the JIT compiler to generate the run-time-optimized media pipeline.

11. The system of claim 10, wherein the annotation instructs the JIT compiler to combine two or more blocks of the media pipeline.

12. The system of claim 10, wherein the annotation instructs the JIT compiler to eliminate a subset of a block of the media pipeline.

13. The system of claim 10, wherein the annotation instructs the JIT compiler to designate an argument of a block as a constant.

14. The system of claim 10, wherein the annotation instructs the JIT compiler to exclude a subset of a block from optimization.

15. A non-transitory computer-readable storage medium including instructions that, when executed by a processing device of a source host system, cause the processing device to:

receive, by a media pipeline framework, a plurality of copies of each block of a media pipeline, wherein a first copy of the plurality of copies is a high-level representation of a respective block, wherein a block comprises discrete processing logic that performs a specified function on media of the media pipeline, wherein the high-level representation comprises descriptions of underlying source-code, and wherein a second copy of the plurality of copies is a machine-readable copy of the respective block, and wherein the high-level representation of a respective block differs from the machine-readable copy of the respective block; and generate, by the processing device, a run-time-optimized media pipeline to receive an input image and generate an output image, using the first copy being the high-level representation and the second copy being the machine-readable copy.

16. The non-transitory computer-readable storage medium of claim 15, wherein at least one of the first copy or the second copy comprise an annotation indicating a description of code that runs for each output pixel of the output image.

17. The non-transitory computer-readable storage medium of claim 16, the processing device further to generate, by a just-in-time (JIT) compiler, the run-time-optimized media pipeline using the annotation.

18. The non-transitory computer-readable storage medium of claim 16, wherein to generate the run-time optimized media pipeline the processing device is to combine two or more blocks of the media pipeline based on the annotation.

19. The non-transitory computer-readable storage medium of claim 16, wherein to generate the run-time optimized media pipeline the processing device is to eliminate a subset of a block of the media pipeline based on the annotation.

20. The non-transitory computer-readable storage medium of claim 16, wherein to generate the run-time optimized media pipeline the processing device is to designate an argument of a block as a constant.

* * * * *